(12) United States Patent
Bression

(10) Patent No.: US 8,627,647 B2
(45) Date of Patent: Jan. 14, 2014

(54) RESIDUAL BURNT GAS SCAVENGING METHOD IN A DIRECT-INJECTION SUPERCHARGED INTERNAL-COMBUSTION MULTI-CYLINDER ENGINE RUNNING UNDER PARTIAL LOADS

(75) Inventor: Guillaume Bression, Vincennes (FR)

(73) Assignee: IFP Energies Nouvelles, Rueil Malmaison (FR)

( * ) Notice: Subject to any disclaimer, the term of this patent is extended or adjusted under 35 U.S.C. 154(b) by 287 days.

(21) Appl. No.: 13/007,299

(22) Filed: Jan. 14, 2011

(65) Prior Publication Data
US 2011/0174249 A1 Jul. 21, 2011

(30) Foreign Application Priority Data
Jan. 19, 2010 (FR) ..................................... 10 00193

(51) Int. Cl.
*F01N 3/00* (2006.01)
(52) U.S. Cl.
USPC ........................................ 60/283; 123/568.14
(58) Field of Classification Search
USPC ........................ 123/76, 316, 568.14; 60/283
See application file for complete search history.

(56) References Cited

U.S. PATENT DOCUMENTS

| | | | | |
|---|---|---|---|---|
| 2,325,032 A * | 7/1943 | Buchi | ........................... | 60/605.1 |
| 2,793,631 A * | 5/1957 | Schilling | ...................... | 123/58.1 |
| 3,046,961 A * | 7/1962 | Dolza | .............................. | 123/76 |
| 4,232,641 A | 11/1980 | Curtil | | |
| 4,424,790 A | 1/1984 | Curtil | | |
| 5,063,886 A * | 11/1991 | Kanamaru et al. | ....... | 123/65 VD |
| 5,230,320 A * | 7/1993 | Hitomi et al. | .............. | 123/559.1 |
| 5,819,693 A | 10/1998 | Curtil | | |
| 6,574,961 B2 * | 6/2003 | Shiraishi et al. | ................ | 60/602 |
| 6,729,124 B2 | 5/2004 | Baeuerle et al. | | |
| 7,082,764 B2 * | 8/2006 | Lecointe et al. | ................ | 60/600 |
| 7,681,550 B2 | 3/2010 | Kobayashi | | |
| 8,037,873 B2 * | 10/2011 | Bression | .................. | 123/568.14 |
| 2003/0051466 A1 | 3/2003 | Baeuerle et al. | | |
| 2006/0272623 A1 | 12/2006 | Pagot | | |
| 2008/0077304 A1 * | 3/2008 | Suzuki et al. | ................. | 701/102 |
| 2008/0275621 A1 | 11/2008 | Kobayashi | | |
| 2009/0194080 A1 | 8/2009 | Bression | | |

FOREIGN PATENT DOCUMENTS

| | | |
|---|---|---|
| EP | 1857654 | 11/2007 |
| EP | 2083155 A1 * | 7/2009 |
| FR | 2828714 | 2/2003 |
| FR | 2886342 | 12/2006 |
| FR | 2926850 | 7/2009 |

* cited by examiner

*Primary Examiner* — Thomas Denion
*Assistant Examiner* — Jason Shanske
(74) *Attorney, Agent, or Firm* — Antonelli, Terry, Stout & Kraus, LLP.

(57) ABSTRACT

A method of scavenging the residual burnt gas of a direct-injection supercharged multi-cylinder internal-combustion engine(10), notably of diesel type, running under partial loads, with a piston moving in a reciprocating motion between a top dead center (PMH) and a bottom dead center (PMB) includes a burnt gas scavenging stage that is carried out by a sequence of opening/closing at least one exhaust valve (18) during engine exhaust phase (E) and at least one sequence of opening/closing at least one intake valve (28) during this exhaust valve opening/closing sequence. The method includes, during the scavenging stage, in controlling the closing time of intake valve (28) so as to cause a decrease in exhaust pressure (Pe) in order to achieve a pressure differential between intake pressure (Pa) and exhaust pressure (Pe) favorable to intake pressure (Pa).

11 Claims, 3 Drawing Sheets

… …

RESIDUAL BURNT GAS SCAVENGING METHOD IN A DIRECT-INJECTION SUPERCHARGED INTERNAL-COMBUSTION MULTI-CYLINDER ENGINE RUNNING UNDER PARTIAL LOADS

FIELD OF THE INVENTION

The present invention relates to a method of scavenging the residual burnt gas of a direct-injection supercharged internal-combustion engine running under partial loads.

BACKGROUND OF THE INVENTION

As it is widely known, the power delivered by an internal-combustion engine depends on the amount of air fed into the combustion chamber of this engine.

Since the amount of air is proportional to its density, the outside air is usually compressed before it is fed into this combustion chamber when high engine power is required.

This operation, referred to as supercharging, can be carried out using any means such as a turbocompressor.

Furthermore, in order to increase even further this amount of air in the combustion chamber of the cylinder, the residual burnt gas initially contained in the dead volume of the combustion chamber is to be discharged in the vicinity of the top dead center of the piston and replaced by supercharged air. This stage is more commonly referred to as burnt gas scavenging and it is generally conducted before the end of the engine exhaust phase.

As it is known from document FR-2,886,342, this scavenging is carried out, at the end of the engine exhaust phase and at the start of the intake phase, when the engine intake pressure is higher than its exhaust pressure. This scavenging stage is performed by overlapping of the exhaust and intake valves of a cylinder by opening simultaneously these valves for some degrees to some ten degrees of crank rotation angle.

The supercharged intake air is thus fed into the combustion chamber before the end of the exhaust phase by expelling the exhaust gas contained therein. This gas is thus discharged through the exhaust valve and replaced by intake air. Document FR-2,926,850 filed by the applicant describes another residual burnt gas scavenging method wherein an exhaust valve opening/closing sequence is carried out during the engine exhaust phase and, during this exhaust valve opening/closing sequence, an intake valve opening/closing sequence is carried out so as to perform residual burnt gas scavenging.

Although this type of engine gives satisfactory results, it however involves quite significant drawbacks.

In fact, for engines running under partial loads, the burnt gas scavenging stage cannot be produced. This is essentially due to the fact that the intake pressure is lower than the exhaust pressure. Therefore, when the exhaust and intake valves are open, the exhaust gas cannot be discharged from the combustion chamber through the exhaust valve.

An amount of residual burnt gas therefore remains in the dead volume and exhaust gas is fed into the intake manifold, thus preventing intake of air into the cylinder.

The present invention aims to overcome the aforementioned drawbacks by means of a burnt gas scavenging method for an engine running under partial loads wherein the exhaust pressure is decreased so as to be lower than the intake pressure.

SUMMARY OF THE INVENTION

The present invention therefore relates to a method of scavenging the residual burnt gas of a direct-injection supercharged multi-cylinder internal-combustion engine, notably of diesel type, running under partial loads, with a piston moving in a reciprocating motion between a top dead center and a bottom dead center, wherein a burnt gas scavenging stage is carried out by means of a sequence of opening/closing at least one exhaust valve during the exhaust phase of the engine and of at least one sequence of opening/closing at least one intake valve during this exhaust valve opening/closing sequence, characterized in that it consists, during the scavenging stage, in controlling the closing time of the intake valve so as to cause a decrease in the exhaust pressure in order to achieve a pressure differential between the intake pressure and the exhaust pressure favourable to the intake pressure.

The method can consist in performing closing of the intake valve before the end of the intake phase.

The method can consist in performing closing of the intake valve at a crank angle ranging between +100° and 0° before the bottom dead center of the intake phase.

The method can consist in performing closing of the intake valve after the end of the intake phase.

The method can consist in performing closing of the intake valve at a crank angle ranging between 0° and −100° after the bottom dead center of the intake phase.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
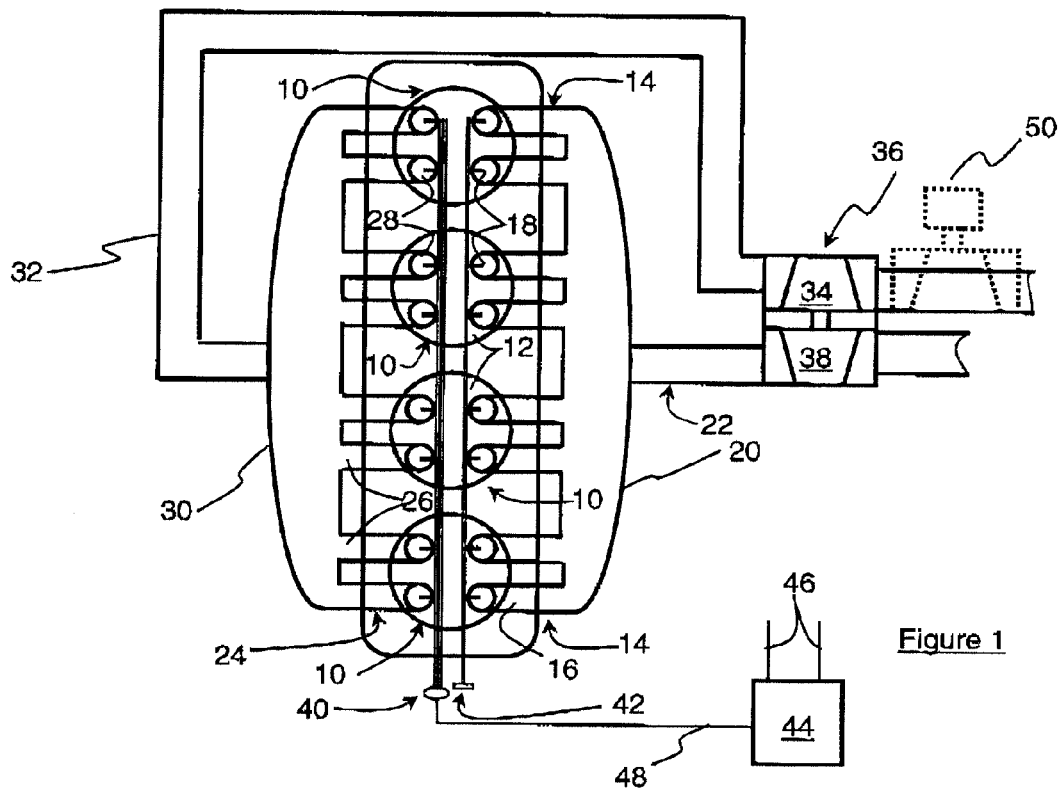
FIG. 1 shows an internal-combustion supercharged engine using the method according to the invention.

In FIG. 1, the internal-combustion engine illustrated is a supercharged internal-combustion engine of self-ignition type, notably a diesel engine, working in four-stroke mode with an intake phase A, a compression phase C, an expansion phase D and an exhaust phase E.

This engine comprises at least two cylinders 10, four cylinders here, in which a piston (not shown) slides in a rectilinear reciprocating motion between a top dead center (PMH) and a bottom dead center (PMB) by delimiting a combustion chamber 12 in which combustion of a fuel mixture takes place.

As it is widely known, this fuel mixture can be either a mixture of supercharged air mixed with recirculated exhaust gas (or EGR) with a fuel, or a mixture of supercharged air with a fuel.

Cylinder 10 comprises at least one burnt gas exhaust means 14, two here, including an exhaust pipe 16 associated with a shutoff means such as an exhaust valve 18.

Exhaust pipes 16 end in an exhaust manifold 20 allowing the burnt gas from the combustion chambers to be discharged, this manifold being connected to an exhaust line 22.

This cylinder also comprises at least one intake means 24, two here, including an intake pipe 26 controlled by a shutoff means such as an intake valve 28.

Usually, an intake manifold 30 is connected to intake pipes 26 and it allows fresh air (generally supercharged, mixed or not with recirculated exhaust gas) to be distributed in combustion chambers 12.

The intake manifold is connected by a line 32 to the outlet of compression section 34 of a turbocompressor 36, whereas exhaust manifold 20 is connected by line 22 to the inlet of turbine 38 of this turbocompressor.

Opening and closing of intake valves 28 is controlled by any known means allowing to vary the lift law of these valves. More particularly, these means allow to achieve at least a double lift of these valves during engine running conditions requiring high power, or a single lift under conventional engine running conditions.

Control means 40 of VVA (Variable Valve Actuation) camshaft type allowing the two lift laws of these valves to be achieved are therefore used. A first law allows to perform at least one sequence of opening/closing of intake valves 28 during exhaust phase E of the engine, followed by a conventional sequence of opening/closing of these valves during intake phase A. The other lift law allows to perform only a sequence of opening/closing of the intake valves during engine intake phase A.

By way of non limitative example, this camshaft comprises a cam associated with a second cam allowing to provide the double lift law for these intake valves during exhaust phase E and intake phase A of the engine, as well as a disengaging device making one of the cams, the second cam for example, inoperative, to achieve the single lift of the intake valves during the engine intake phase.

Opening and closing of exhaust valves 18 is controlled by any conventional means, such as a conventional camshaft 42 controlled in rotation by a drive means connected to the crankshaft of this engine, such as a timing belt or a chain.

Of course, without departing from the scope of the invention, these control means 40 and 42 can be specific control means for each valve, such as an electromagnetic, electropneumatic actuator or other, directly acting on the valve rod.

It can be noted that the term "lift" corresponds to the graphical representation (along two axes) of the motion of a valve from the moment it starts opening the orifice of the pipe to the orifice full open position to the moment it ends closing this orifice.

This engine also comprises a processing unit 44 referred to as engine calculator that contains maps or data charts allowing, according to the values of the engine parameters transmitted by data lines 46, such as notably the intake pressure Pa in intake manifold 30 and the exhaust pressure Pe in exhaust manifold 20, the engine speed or the load thereof, to evaluate the power to be generated by this engine to meet the vehicle driver's request.

More precisely, this calculator allows, according to these values, to control the lift laws of intake valves 28 through a control line 48 acting upon means 40 so as to allow a single or a double lift of these valves.

Thus, when the engine has to run under conditions corresponding to a high power requirement, the calculator controls this engine so that it works with a stage of scavenging the residual burnt gas present in the combustion chamber while allowing to generate a pressure differential between intake pressure Pa recorded in the intake manifold and exhaust pressure Pe prevailing in the exhaust manifold favourable to intake pressure Pa.

Figure 2:
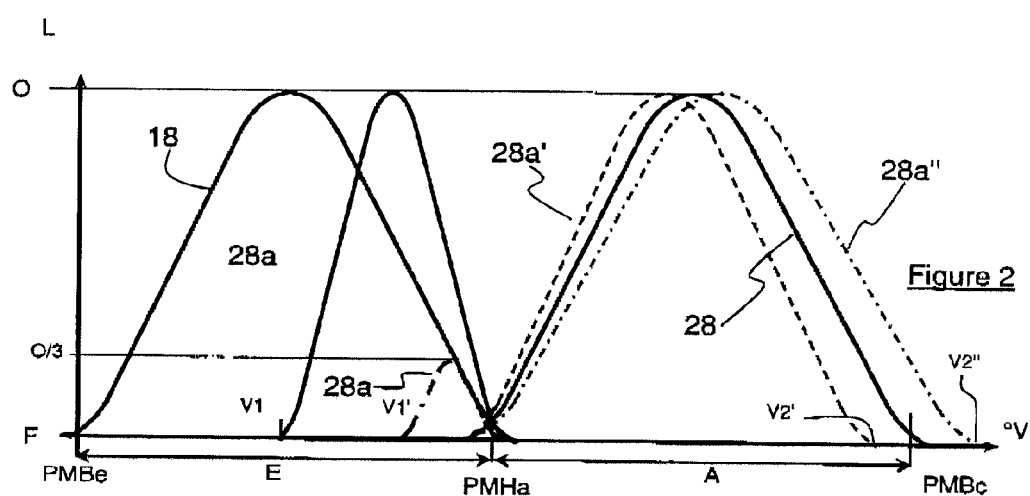
FIG. 2 shows curves illustrating the various lift laws (L) of the intake and exhaust valves of the cylinder during the scavenging stage, as a function of the crank rotation (in crank degrees ° V) of the engine using the method according to the invention.
Figure 3:
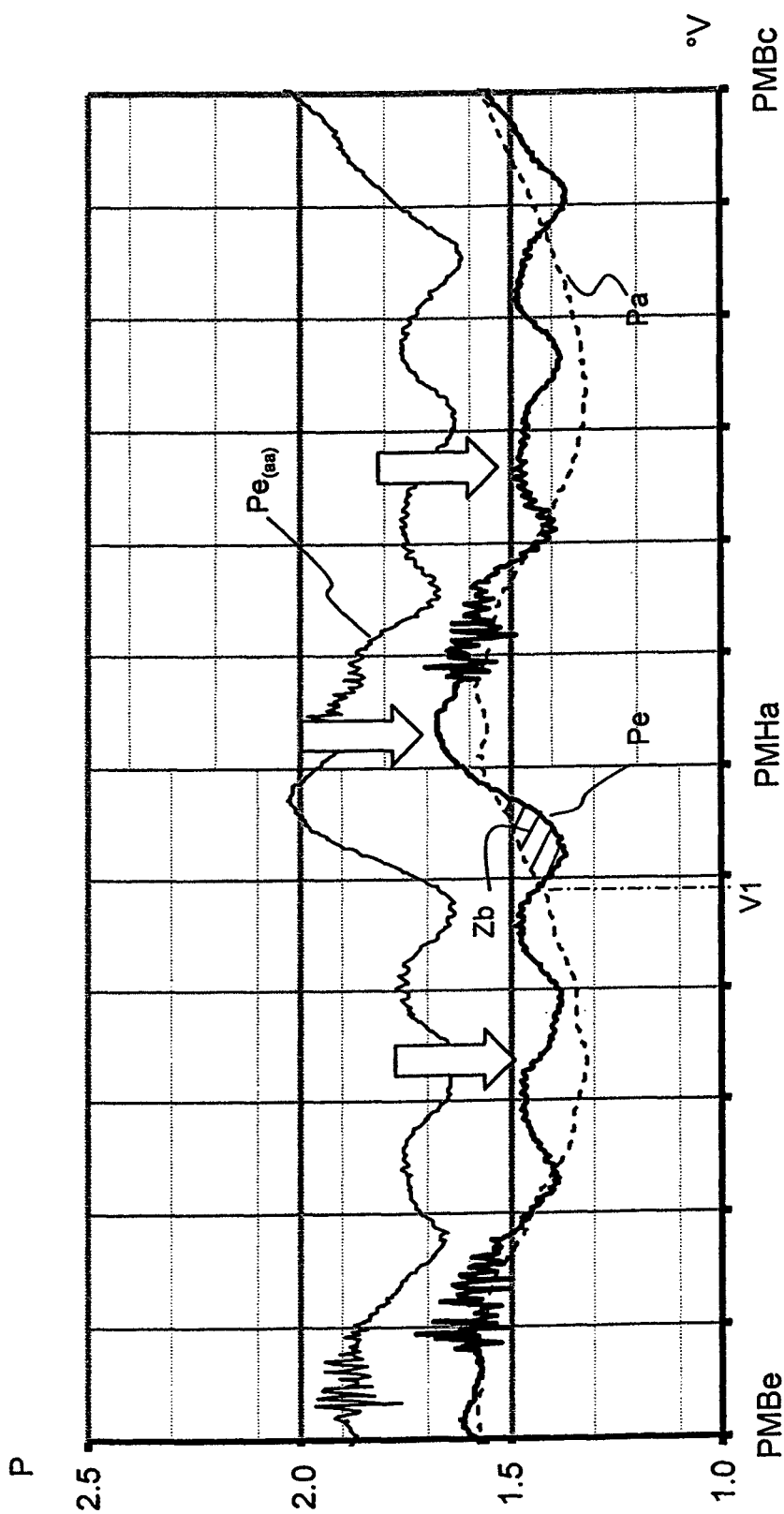
FIGS. 3 and 4 are graphs with curves illustrating the pressure (P in bar) at the intake (Pa) and at the exhaust (Pe) of a cylinder as a function of the crank rotation (in crank degrees ° V).

In connection additionally with FIG. 2 that shows the various lift laws of the intake 28 and exhaust 18 valves between an open (O) and a closed (F) position as a function of the crank rotation angle (° V), associated with FIG. 3 that shows the intake Pa and exhaust Pe pressures during these crank rotation angles, calculator 44 controls more particularly control means 40 through line 48 so as to achieve double lift of intake valves 28 in order to meet the power requirement with a burnt gas scavenging stage.

More precisely, as better illustrated in this FIG. 2, during engine exhaust phase E, exhaust valves 18 conventionally follow an opening/closing sequence between the exhaust bottom dead center (PMBe) and the intake top dead center (PMHa) of the piston, so as to discharge the exhaust gas contained in the combustion chamber towards exhaust manifold 20.

Together with this exhaust valve opening/closing sequence, control means 40 are controlled by the calculator so as to achieve at least one opening/closing sequence of intake valves 28a during this exhaust phase and during the exhaust valve opening/closing sequence.

More particularly, and by way of example, these intake valves open at crank angle V1 after PMBe and they close at PMHa.

In the case of an engine running under low loads or partial loads with an opening/closing sequence of intake valves 28a (FIG. 2) during the exhaust phase, the exhaust pressure curve $Pe_{(aa)}$ (thin line) for this engine is always above the intake pressure curve Pa (dotted line) throughout the engine running cycle, as illustrated in FIG. 3, with consequently an exhaust pressure that is higher than the intake pressure.

Considering the pressure differential favourable to the exhaust pressure, the exhaust gas contained in combustion chamber 12 cannot be discharged through exhaust valves 18 towards exhaust manifold 20.

In order to be able to carry out the aforementioned burnt gas scavenging stage, the calculator controls intake valve control means 40 so as to achieve at least one opening/closing sequence of these intake valves during intake phase (A) in such a way that closing of these intake valves occurs before (curve 28a' with a crank angle V2' for closing) or after (curve 28a" with a crank angle V2" for closing) the compression bottom dead center (PMBc).

Advantageously, angle V2' is less than or equal to +100° and greater than 0° before PMBc, and angle V2" is greater than 0° and less than or equal to −100° after PMBc (the bottom dead center of the intake phase merging with PMBc).

This has the effect of generating an effective compression ratio decrease, an exhaust gas flow rate reduction and an increase in the temperature of this exhaust gas in the combustion chamber of the cylinder, which leads to a decrease in the filling of the exhaust manifold and, consequently, in the exhaust pressure.

Curve $Pe_{(aa)}$ of FIG. 3 is therefore shifted to the bottom of the graph and reaches the position of curve Pe.

Of course, the person skilled in the art has the ability to determine the crank angles (V2" or V2") for closing of the intake valve so that the position of the exhaust pressure curve Pe is such that there is a zone Zb between curves Pe and Pa where the pressure differential is favourable to the intake pressure during the burnt gas scavenging stage (between crank angle V1 and PMHa).

Thus, the exhaust gas contained in the combustion chamber is replaced by supercharged air, which allows to globally increase the amount of air present in the combustion chamber at the end of the engine intake phase A, and therefore to improve the emissions decrease and the consumption reduction.

When this engine runs under full load, the scavenging method is the one described in patent application FR-2,926,850 with an opening/closing sequence of exhaust valves 18 during engine exhaust phase E, an opening/closing sequence of intake valves 28 during this exhaust valve opening/closing sequence, and a conventional opening/closing sequence of intake valves 28 during the engine intake phase.

In order to be able to achieve a pressure differential between the intake pressure and the exhaust pressure favourable to the intake pressure during the scavenging stage, it is also possible to increase the amount of supercharged air fed to the engine intake. This has the effect of leading to an intake pressure increase without the exhaust pressure being modified.

Figure 4:
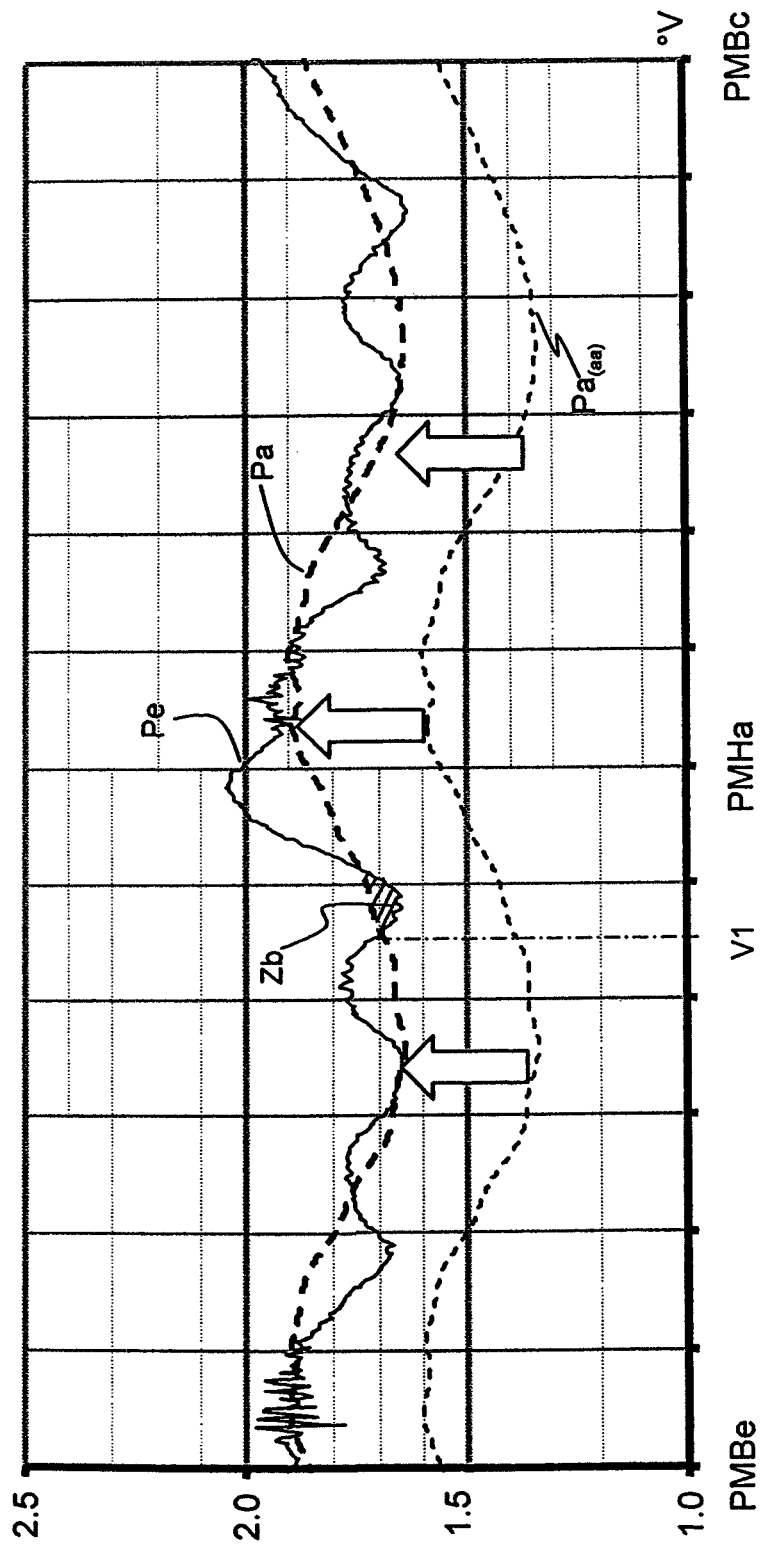

In connection with FIG. 1 associated with FIG. 4, the increase in the amount of air is provided by an additional compressor 50 (illustrated in dotted line) that is driven mechanically, through a link with the engine crankshaft for example, or electrically, by an electric motor for example. This compressor is controlled by calculator 44 so as to be operational during the scavenging stage and when the engine runs under low or partial loads.

In combination with this additional compressor, the scavenging method used is the one described in patent application FR-2,926,850, as mentioned above.

Calculator 44 thus controls compressor 50 in such a way that it increases the amount of air fed to compression section 34 of turbocompressor 36. This air is then compressed by this compression section, which has the effect of feeding into intake manifold 30 a larger amount of air while providing a higher pressure than that provided only through the action of compression section 34.

The initial intake pressure curve $Pa_{(aa)}$, i.e. the curve resulting from the sole use of compression section 34, is thus shifted to the top of FIG. 4 and reaches the location of curve Pa (in thick dotted line) with a zone Zb wherein the intake pressure is higher than the exhaust pressure (thin line), which allows to carry out the burnt gas scavenging stage.

Of course, as mentioned above, the person skilled in the art will determine the characteristics and performances of compressor 50 so that zone Zb with a pressure differential favourable to intake pressure Pa is effective during at least part of the burnt gas scavenging stage.

When this engine runs under full load conditions, the scavenging method is the one described in patent application FR-2,926,850 with the various opening/closing sequences of exhaust valves 18 and intake valves 28, and standstill of compressor 50.

During conventional running of the engine without a burnt gas scavenging stage, calculator 44 controls control means 40 so as not to achieve, during exhaust phase E, an intake valve opening/closing sequence during the exhaust valve opening/closing sequence. This exhaust phase is followed by an intake phase A wherein the intake valves follow a conventional opening/closing sequence between PMHa and PMBc.

The invention therefore readily allows to carry out exhaust gas scavenging for an engine running according to various configurations between low load and full load conditions.

For the present invention, the lift height of intake valves 28a is substantially equal to the lift height of the exhaust valves during the exhaust phase, but the lift height of these intake valves may be varied, for example between a full open position O and a one-third open position O/3, so as to be able to control discharge of the residual burnt gas, as illustrated in thick mixed line in FIG. 2.

Similarly, the spread of the intake valves lift during the exhaust phase can be variable so as to start the opening/closing sequence at angle V1' and to end it at a crank angle located before PMHa.

Preferably, the maximum lift and the maximum spread of these intake valves during the exhaust phase are lower than those of the exhaust valves.

The invention claimed is:

1. A method of scavenging the residual burnt gas of a direct-injection supercharged multi-cylinder internal-combustion engine, notably of diesel type, running under partial loads, with a piston moving in a reciprocating motion between a top dead center and a bottom dead center, wherein a burnt gas scavenging stage is carried out by means of a sequence of opening and closing at least one exhaust valve during an engine exhaust phase and of at least one sequence of opening and closing at least one intake valve during this exhaust valve opening and closing sequence, characterized in that the method comprises, during the scavenging stage, in controlling the closing time of the at least one intake valve so as to cause a decrease in an exhaust pressure in order to achieve a pressure differential between an intake pressure and the exhaust pressure favourable to the intake pressure.

2. A method of scavenging the residual burnt gas of an engine as claimed in claim 1, characterized in that the method comprises performing closing of the at least one intake valve before the end of an intake phase.

3. A method of scavenging the residual burnt gas of an engine as claimed in claim 2, characterized in that the method comprises performing closing of the at least one intake valve at a crank angle ranging between +100° and 0° before the bottom dead center of the intake phase.

4. A method of scavenging the residual burnt gas of an engine as claimed in claim 1, characterized in that the method comprises performing closing of the at least one intake valve after the end of an intake phase.

5. A method of scavenging the residual burnt gas of an engine as claimed in claim 4, characterized in that the method comprises performing closing of the at least one intake valve at a crank angle ranging between 0° and −100° after the bottom dead center of the intake phase.

6. A method of scavenging the residual burnt gas of an engine as claimed in claim 1, wherein the controlling of the closing time of the at least one intake valve occurs during an engine intake phase.

7. A method of scavenging residual burnt gas of a diesel type direct-injection supercharged multi-cylinder internal-combustion engine, the method comprising:
   a burnt gas scavenging stage carried out while the internal-combustion engine is running under partial loads with a piston reciprocating between a bottom dead center and a top dead center, the burnt gas scavenging stage comprising:
      an exhaust phase comprising opening and closing at least one exhaust valve and opening and closing at least one intake valve,
      an intake phase comprising opening and closing the at least one intake valve while controlling a closing time of the at least one intake valve to cause a decrease in an exhaust pressure in order to achieve a pressure differential between an intake pressure and the exhaust pressure favourable to the intake pressure.

8. A method of scavenging the residual burnt gas of an engine as claimed in claim 7, wherein controlling the closing time of the at least one intake valve comprises closing the at least one intake valve before the end of the intake phase.

9. A method of scavenging the residual burnt gas of an engine as claimed in claim 8, wherein the at least one intake valve is closed at a crank angle ranging between +100° and 0° before the bottom dead center of the intake phase.

10. A method of scavenging the residual burnt gas of an engine as claimed in claim 7, wherein controlling the closing time of the at least one intake valve comprises closing the at least one intake valve after the end of the intake phase.

11. A method of scavenging the residual burnt gas of an engine as claimed in claim 10, wherein the at least one intake valve is closed at a crank angle ranging between 0° and −100° after the bottom dead center of the intake phase.

* * * * *